(12) United States Patent
Watanabe

(10) Patent No.: US 8,237,778 B2
(45) Date of Patent: Aug. 7, 2012

(54) IMAGE OUTPUT SYSTEM, IMAGE GENERATING DEVICE AND METHOD OF GENERATING IMAGE

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1270 days.

(21) Appl. No.: 11/987,339

(22) Filed: Nov. 29, 2007

(65) Prior Publication Data
US 2008/0129840 A1   Jun. 5, 2008

(30) Foreign Application Priority Data
Dec. 1, 2006   (JP) ................................. 2006-326065

(51) Int. Cl.
*H04N 7/18* (2006.01)
*G06F 15/16* (2006.01)
(52) U.S. Cl. ........................................................ 348/51
(58) Field of Classification Search ............... 348/51–54
See application file for complete search history.

(56) References Cited

U.S. PATENT DOCUMENTS

| | | | |
|---|---|---|---|
| 6,233,004 B1* | 5/2001 | Tanaka et al. ...................... | 348/48 |
| 6,757,441 B1* | 6/2004 | Katayama et al. ............. | 382/248 |
| 6,952,205 B2* | 10/2005 | Kawahara ...................... | 345/420 |
| 7,039,869 B2 | 5/2006 | Smith | |
| 7,560,837 B2 | 7/2009 | Umeda et al. | |
| 7,643,684 B2* | 1/2010 | Lee et al. ....................... | 382/190 |
| 2001/0050684 A1 | 12/2001 | Smith | |
| 2001/0052935 A1* | 12/2001 | Yano ............................. | 348/207 |
| 2002/0110262 A1* | 8/2002 | Iida et al. ...................... | 382/104 |
| 2005/0013507 A1* | 1/2005 | Lee et al. ....................... | 382/284 |
| 2005/0105179 A1* | 5/2005 | Taira et al. ..................... | 359/463 |
| 2005/0105610 A1* | 5/2005 | Sung ......................... | 375/240.01 |
| 2006/0087670 A1 | 4/2006 | Smith | |
| 2006/0119911 A1 | 6/2006 | Narusawa | |
| 2006/0120593 A1* | 6/2006 | Oshino .......................... | 382/154 |
| 2007/0202949 A1* | 8/2007 | Kawade et al. ................. | 463/32 |

(Continued)

FOREIGN PATENT DOCUMENTS

JP   2001-319216 A   11/2001

(Continued)

OTHER PUBLICATIONS

English translation of Japanese Office Action issued Jan. 13, 2010 for Application No. 2006-326065.

(Continued)

*Primary Examiner* — Zarni Maung
(74) *Attorney, Agent, or Firm* — Birch, Stewart, Kolasch & Birch, LLP

(57) ABSTRACT

A system includes a first specifying unit which specifies a first output information showing at least the viewpoint of a multi-viewpoint image, a second specifying unit which specifies a second output information showing an image area to be output as a single viewpoint image out of the multi-viewpoint images, and a recording unit which associates the second output information specified by the second specifying unit with the multi-viewpoint image and the first output information specified by the first specifying unit and records the second output information in a predetermined recording medium. A device which can output a multi-viewpoint image can output the multi-viewpoint image based on the first output information, and a device which cannot output a multi-viewpoint image but a single viewpoint image can output the single viewpoint image suitable for appreciation based on the second output information.

8 Claims, 9 Drawing Sheets

U.S. PATENT DOCUMENTS

2009/0263007 A1    10/2009    Kitaura et al.

FOREIGN PATENT DOCUMENTS

| | | |
|---|---|---|
| JP | 2001-326948 A | 11/2001 |
| JP | 2002-77942 A | 3/2002 |
| JP | 2004-336492 A | 11/2004 |
| JP | 2004-349731 A | 12/2004 |
| JP | 2006-13760 A | 1/2006 |
| JP | 2006-42166 A | 2/2006 |
| JP | 2006-141129 A | 6/2006 |
| JP | 2006-231651 A | 9/2006 |
| JP | 2006-279661 A | 10/2006 |
| JP | 2007-036529 A | 2/2007 |

OTHER PUBLICATIONS

Japanese Office Action issued in Oct. 19, 2009 in Japanese Application No. JP-2006-326065.

Japanese Office Action dated Jun. 12, 2012 issued in corresponding Japanese Patent application No. 2010-148636. (English translation is attached).

* cited by examiner

IMAGE OUTPUT SYSTEM, IMAGE GENERATING DEVICE AND METHOD OF GENERATING IMAGE

BACKGROUND OF THE INVENTION

1. Field of the Invention

The present invention relates to picking up a multi-viewpoint image or outputting a multi- and a single-viewpoint image.

2. Description of the Related Art

According to Japanese Patent Application Laid-Open No. 2002-77942, a multiple-lens stereoscopic image pickup device includes a camera body for photoelectrically converting an object image imaged by a projection lens with a CCD imaging sensor and a stereo adapter disposed at a front stage of the lens and receiving light from the object at different positions according to a parallax to guide the light to a different area of the imaging sensor. The image pickup device trims an object image signal based on an output of the imaging sensor to set a plurality of imaging picture frames corresponding to a plurality of monocular images being constituents of one multiple-lens stereoscopic image in the imaging area and generates a structured stereo image according to a stereo image handling format based on the plurality of monocular images obtained corresponding to the imaging picture frames.

According to Japanese Patent Application Laid-Open No. 2001-319216, a Global laboratory software (hereinafter referred to as GLS) is provided for receiving the order command of the user, storing and processing the digital image of a client and controlling the quality of print operation. The GLS has adaptability capable of allowing the addition of a novel input/output device and providing the language supports of various countries. The GLS can be connected to a network, can store the digital images of clients in an image center and can output the digital image file to various input/output devices for providing various kinds of services.

Directly converting image data in which multi-viewpoint images are recorded into printing data probably provides printed matter unsuitable for appreciation. As described in Japanese Patent Application Laid-Open No. 2002-77942, particularly synthesizing and recording multi-viewpoint images in one image cause both the left and the right viewpoint images to be printed on a printing medium.

The present invention has been made in view of the above problems and has for its purpose to output a single viewpoint image suitable for appreciation from image data recorded as data of a multi-viewpoint image.

SUMMARY OF THE INVENTION

An image output system according to the present invention includes an image generating unit which generates a multi-viewpoint image being an image from plural different viewpoints; a first specifying unit which specifies a first output information showing at least the viewpoint of a multi-viewpoint image generated by the image generating unit; a second specifying unit which specifies a second output information showing an image area to be output as a single viewpoint image out of the multi-viewpoint images; a recording unit which associates the second output information specified by the second specifying unit with the multi-viewpoint image and the first output information specified by the first specifying unit and records the second output information in a predetermined recording medium in a general-purpose format; a first output unit which outputs the multi-viewpoint image based on the first output information recorded in the predetermined recording medium; and a second output unit which outputs the single viewpoint image based on the second output information recorded in the predetermined recording medium.

According to the image output system of the present invention, multi-viewpoint image is associated with the first and the second output information and recorded. A device capable of outputting a multi-viewpoint image can output the multi-viewpoint image based on the first output information, and a device capable of outputting not a multi-viewpoint image but a single viewpoint image can output the single viewpoint image suitable for appreciation based on the second output information.

The image generating unit may generate the multi-viewpoint image into a single synthesized image, the first specifying unit may specify the first output information showing an area to be output as each viewpoint image out of the single synthesized images, and the recording unit may record the first and the second output information and the synthesized image in a single file.

The recording unit may record images from plural different viewpoints as a separate viewpoint image in separate image files respectively, may record the second output information in a separate file in the general-purpose format and may record information which associates the file of the second output information with the image file including an area shown by the second output information.

The recording unit may combine the files of separate viewpoint images in which images from plural different viewpoints are stored to a single image file and may record the file, may record the second output information in separate files in the general-purpose format and may record information which associates the file of the second output information with the single image file including an area shown by the second output information.

When the second output device includes a printer, the area shown by the second output information is preferably specified to conform to the aspect ratio of printing paper of the printer.

An image generating device according to the present invention includes an image generating unit which generates a multi-viewpoint image being an image from plural different viewpoints; a first specifying unit which specifies a first output information showing at least the viewpoint of a multi-viewpoint image generated by the image generating unit; a second specifying unit which specifies a second output information showing an image area to be output as a single viewpoint image out of the multi-viewpoint images; and a recording unit which associates the second output information specified by the second specifying unit with the multi-viewpoint image and the first output information specified by the first specifying unit and records the second output information in a predetermined recording medium in a general-purpose format.

A method of generating an image according to the present invention includes the steps of: generating a multi-viewpoint image being an image from plural different viewpoints; specifying a first output information showing at least the viewpoint of generated multi-viewpoint image; and specifying a second output information showing an image area to be output as a single viewpoint image out of the multi-viewpoint images; and associating the second output information with the multi-viewpoint image and the first output information and recording the second output information in a predetermined recording medium in a general-purpose format.

According to the method of the present invention, multi-viewpoint images are associated with a first and a second output information and recorded in the recording medium. A device capable of outputting a multi-viewpoint image can output the multi-viewpoint image based on the first output information, and a device capable of outputting not a multi-viewpoint image but a single viewpoint image can output the single viewpoint image suitable for appreciation based on the second output information.

DETAILED DESCRIPTION OF THE PREFERRED EMBODIMENTS

First Embodiment

Figure 1:
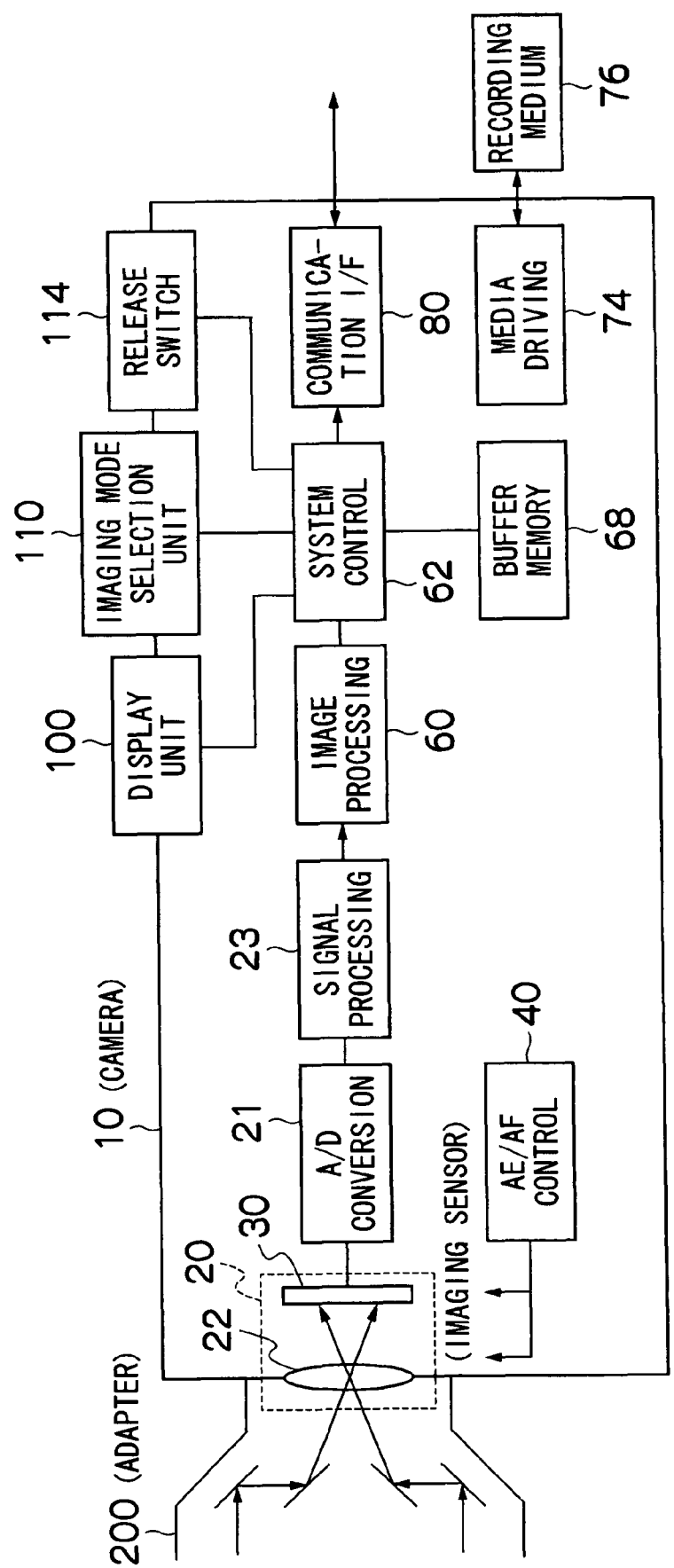
FIG. 1 is a block diagram of a camera.

FIG. 1 is a block diagram of a digital camera 10 according to a preferable embodiment of the present invention. The digital camera 10 includes an imaging unit 20, a signal processing unit 23, an AE/AF control unit 40, an image processing unit 60, a display unit 100, an imaging mode selection unit 110 and a release switch 114. The digital camera 10 further includes a system control unit 62 for controlling each block, a buffer memory 68, a media driving unit 74 and a communication I/F unit 80.

At preceding stage, the digital camera 10 is connected to an adapter 200 which receives light from an object at different positions according to parallax to guide the light to a different area of an imaging sensor 30.

The imaging unit 20 includes an image pickup lens 22 for imaging an object image and imaging sensor 30 for photo-electrically converting the object image from the image pickup lens 22 into an image signal. The image pickup lens 22 includes a focus lens and a zoom lens and so on.

The object image is imaged on a light-receiving surface of the imaging sensor 30 by the above configuration. Electric charges are stored in each sensor element (not shown) in the imaging sensor 30 according to the light quantity of the imaged object image (hereinafter, the charges are referred to as "stored electric charges"). The stored electric charges are read out by a read gate pulse into a shift register (not shown) and then sequentially read out by a register transfer pulse as a voltage signal.

Since the digital camera 10 generally has an electronic shutter function, it is not essential for the digital camera 10 to include a mechanical shutter. In order to realize the electronic shutter function, the imaging sensor 30 is provided with a shutter drain via a shutter gate. When the shutter gate is driven, the stored electric charges are drained out into the shutter drain. Controlling the shutter gate enables controlling a time period during which electric charges are accumulated in each sensor element, i.e., controlling a shutter speed.

The voltage signal output from the imaging sensor 30, that is, an analog signal is output to the A/D converting unit 21. The A/D converting unit 21 converts an analog image signal into a digital image data and outputs the digital image data to the signal processing unit 23.

The signal processing unit 23 subjects the input image data to various processes such as gain adjustment, color correction, gamma correction and Y/C conversion.

The AE/AF control unit 40 measures distance to an object and luminance of the object based on data obtained from stored electric charges of the imaging sensor 30 in response to the depression of the release switch 114.

The AE/AF control unit 40 adjusts the zoom magnification and focus of the image pickup lens 22 based on imaging conditions such as zoom magnification instructed by a zoom switch (including a wide button and a tele-button).

The AE/AF control unit 40 determines a diaphragm value and a shutter speed based on an integrated value of RGB digital signals of one image frame, i.e., based on AE information, adjusts a diaphragm amount and opens or closes the shutter in accordance with the determined value, respectively.

When a user instructs the camera to capture an image, the AE/AF control unit 40 instructs the imaging sensor 30 to start to store electric charges. After a shutter time period calculated from measured photometric data has passed, the stored electric charges are output to the signal processing unit 23.

The image processing unit 60 provides digital image data from the signal processing unit 23 with YC conversion to generate a luminance signal Y and color difference (chroma) signals B-Y and R-Y. The luminance signal and the color difference signals are temporarily stored by the system control unit 62 in the buffer memory 68. The system control unit 62 sequentially reads the luminance signal and the color difference signals from the buffer memory 68 and compresses the signals. Thus compressed data (hereinafter referred to as "compressed data") is written in a recording medium 76 through a media driving unit 74.

The buffer memory 68 is generally formed of a memory comparatively inexpensive and large in capacity like a DRAM. The buffer memory 68 has a function as a frame memory for storing data output from the imaging unit 20, as a system memory for loading various programs and as a work area.

The image processing unit 60 further includes an encoder. The encoder receives the luminance signal and the color difference signal, converts these signals into a video signal such as an NTSC (National Television System Committee) or a PAL (Phase Alternation by Line) signal and outputs it to the display unit 100.

The media driving unit 74 generates a required signal, or performs logic or voltage conversion, etc. in accordance with a signal specification recognized by the recording medium 76. The digital camera 10 may support a standard I/O card conforming to, for example, PCMCIA (Personal Computer Memory Card International Association) as the foregoing recording medium 76. In that case, the media driving unit 74 may be formed of a bus controlling LSI for PCMCIA, etc.

The communication I/F unit 80 controls protocol conversion in accordance with communication specifications, for example, USB (Universal Serial Bus), RS-232C and Ethernet, etc. supported by the digital camera 10. The communication I/F unit 80 includes a driver IC, if required, and communicates with external appliances including a network via a connector. In addition to the above standard specifications, data may be transferred by an original I/F between external appliances such as, for example, a printer 300 and game machine, etc. described later.

The display unit 100 that has an LCD monitor with a screen diagonal size of 2 inches, for example, is provided on the back of the camera to display current imaging and reproducing modes, an imaging and reproducing zoom-magnification, a residual amount of a battery cell, a date, a screen for setting modes and an object image. In addition, the display unit 100 displays information such as picture quality (FINE, NORMAL and BASIC), ON/OFF of an electronic flash, the number of images normally capturable, the number of pixels and a battery capacity according to user's instruction.

The imaging mode selection unit 110 includes mechanisms and electric members required for the user to set or instruct the imaging mode of the digital camera 10 to the camera 10.

The release switch 114 has a two-step structure allowing half-depressing and complete-depressing of it. For example, half-depressing the release switch 114 locks AF and AE. Then, completely depressing the release switch 114 captures an image into the digital camera 10 and the image is subjected to a required signal processing and a data compression and recorded in the buffer memory 68 and/or the recording medium 76, etc.

The main operation based on the above configuration is described below. First, the power supply switch of the digital camera 10 is turned on to supply an electric power to each portion of the camera. The system control unit 62 reads a status in the imaging mode selection unit 110 to determine as to whether the digital camera 10 is in the imaging mode or in the reproducing mode.

When the digital camera 10 is in the imaging mode, the system control unit 62 monitors a half-depressing status in the release switch 114. When the system control unit 62 detects the half-depressing status, the system control unit 62 instructs the AE/AF control unit 40 to obtain photometric data and range-finding data from the stored electric charge in imaging sensor 30. The AE/AF control unit 40 operates based on the obtained data to focus the image pickup lens 22 and adjust the diaphragm.

When the adjustment is completed, the system control unit 62 causes the display unit 100 to display characters such as "standby" on its screen to inform a user of the status and then monitors a complete depressing status of the release switch 114. Completely depressing the release switch 114 closes the shutter after a predetermined shutter time period has passed and then the stored electric charges in the imaging sensor 30 are drained out into the signal processing unit 23.

The digital image data generated by process of the signal processing unit 23 is temporarily stored in the buffer memory 68, then processed by the image processing unit 60 and the system control unit 62 and recorded in the recording medium 76 through the media driving unit 74. The recorded image is displayed for a moment on the display unit 100 with the image frozen to inform the user.

On the other hand, when the digital camera 10 is in the reproducing mode, the system control unit 62 reads an image captured last from the buffer memory 68 through the system control unit 62 to reproduce the image on the LCD monitor of the display unit 100. The user instructs the digital camera to "forward feed" or "reverse feed" by depressing a button in this status to read an image captured before and after the currently displayed image and reproduce it.

Figure 2:
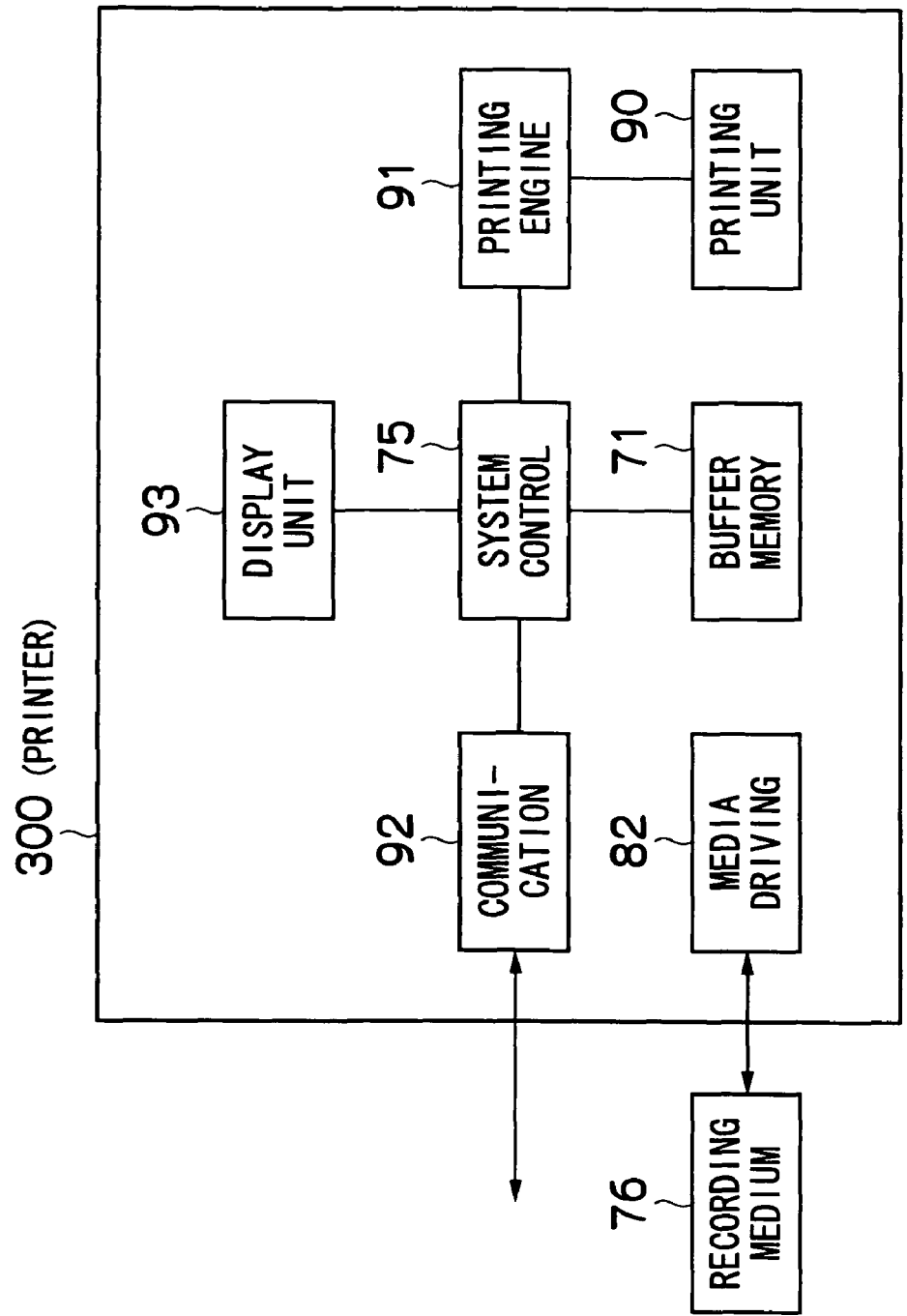
FIG. 2 is a block diagram of a printer.

FIG. 2 is a block diagram illustrating the configuration of hardware of the printer 300.

When the user inserts the recording medium 76 into a media slot of the printer 300, a system control unit 75 loads a control software recorded in a nonvolatile recording medium (not shown) onto a buffer memory 71. Image data is compressed in a predetermined format and recorded in the recording medium 76. The system control unit 75 instructs a media driving unit 82 to read the image data to obtain a required image data from the recording medium 76 to restore it to an original data and to record the image data in the buffer memory 71. The image data can be obtained through a communication I/F unit 92.

When the user depresses a desired position of a button or a touch panel (not shown), required information such as print size and the number of prints is converted into an electric signal corresponding to the position and the electric signal is input into the system control unit 75. The input information is displayed on the display unit 93.

The system control unit 75 ascertains whether the user has finished inputting information required for printing. When the required information is input, a printing engine 91 forms print job data from the image data stored in the buffer memory 71 to send the data to the printing unit 90. The system control unit 75 conducts a series of these processes.

The printing unit 90 prints images on a printing medium with various printing systems such as ink jet system or TA system and ejects the printed images to the outside.

Figure 3:
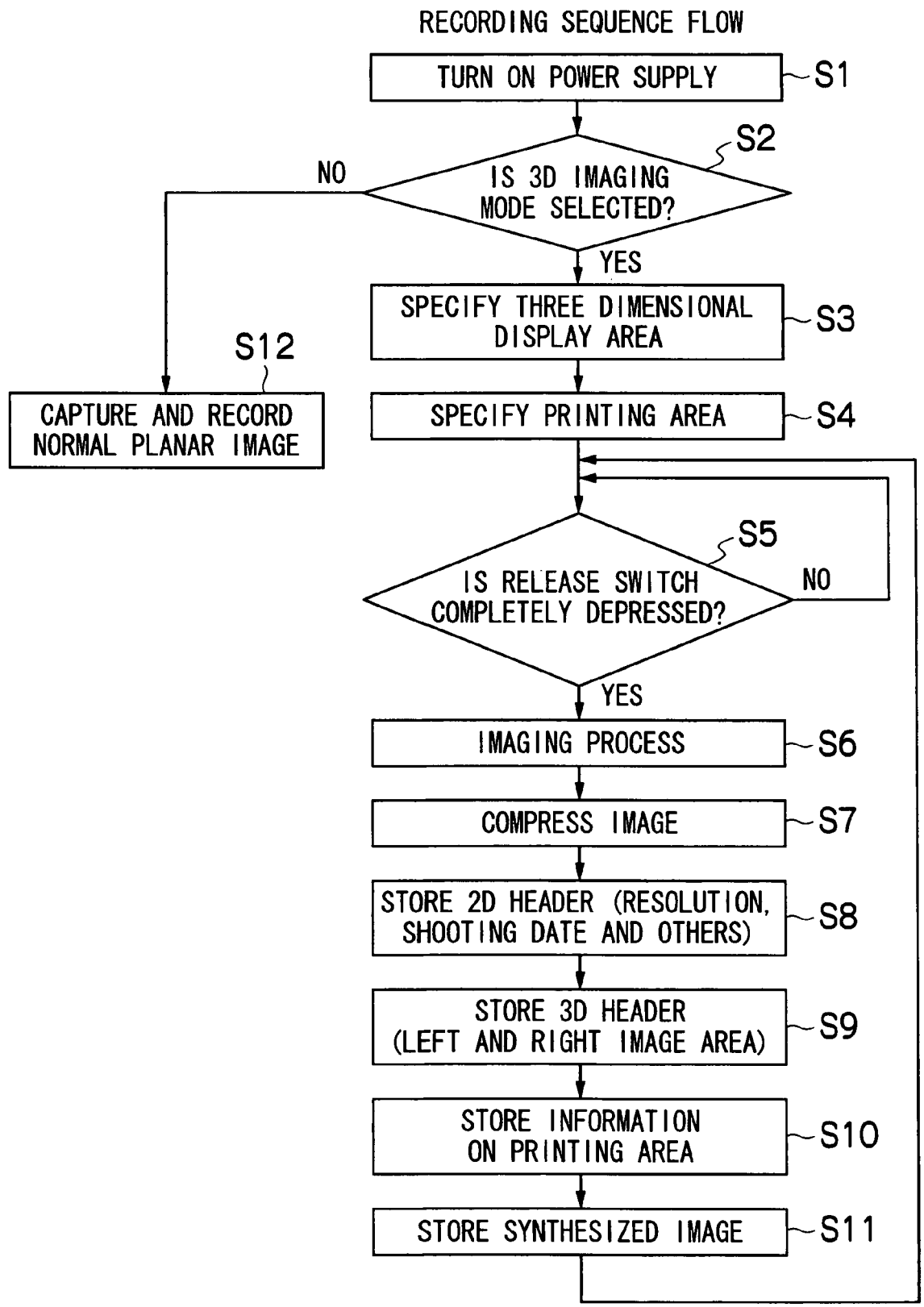
FIG. 3 is a flow chart illustrating the flow of image recording operation.

FIG. 3 is a flow chart illustrating the flow of an image recording operation of the camera 10. The system control unit 62 controls the execution of the process.

At a step S1, a power supply switch is depressed to start supplying power to each block of the camera 10.

At a step S2, a determination is made which imaging mode is selected in either the multi-viewpoint imaging mode (where, three dimension) or the normal mode according to operation status in the imaging mode selection unit 110. When the multi-viewpoint imaging mode is selected, the process proceeds to the step S2. When the normal imaging mode is selected, the process proceeds to the step S12.

Figure 4:
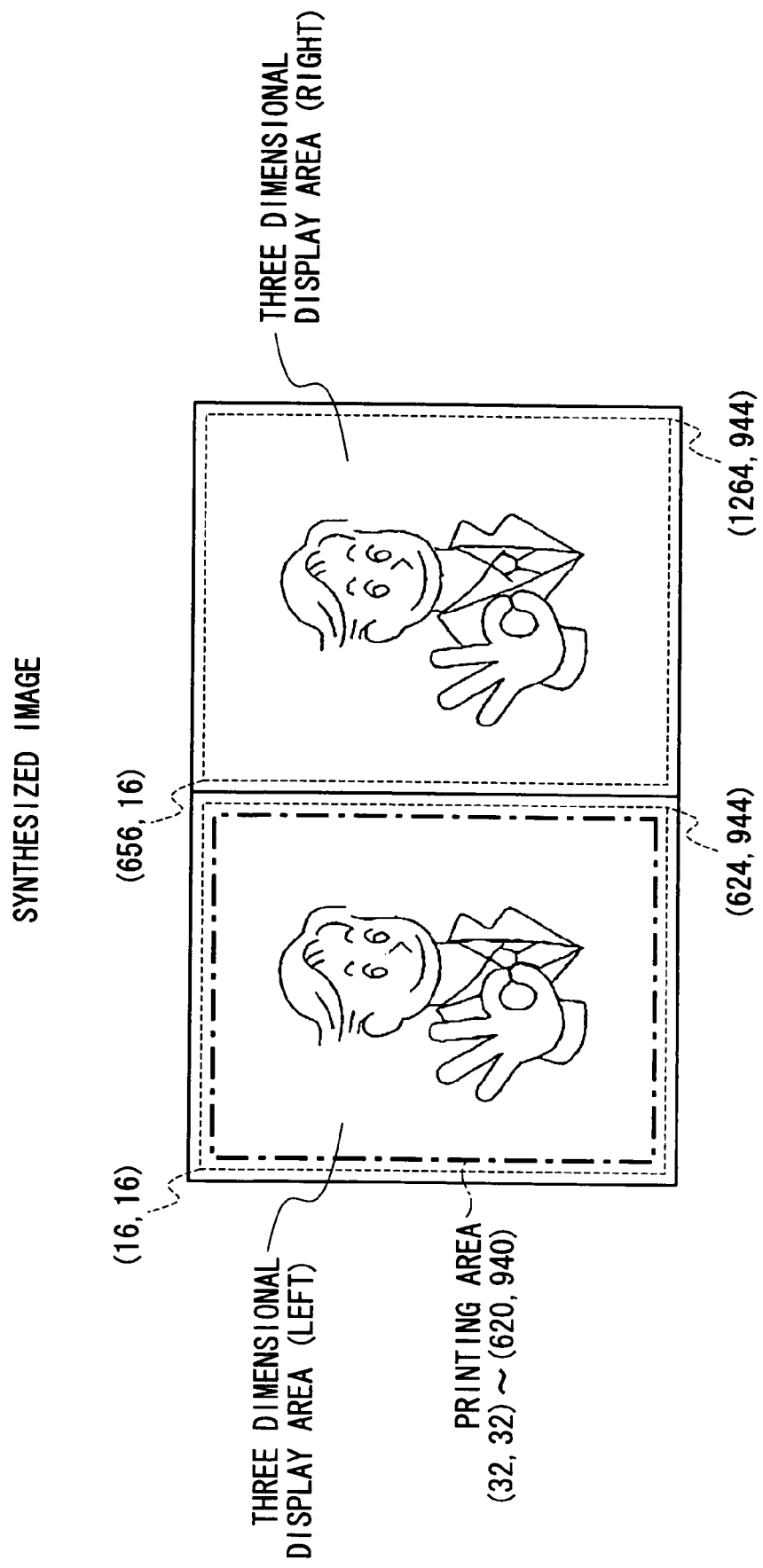
FIG. 4 is a picture illustrating an example of synthesized image of a multi-viewpoint image.
Figure 5:
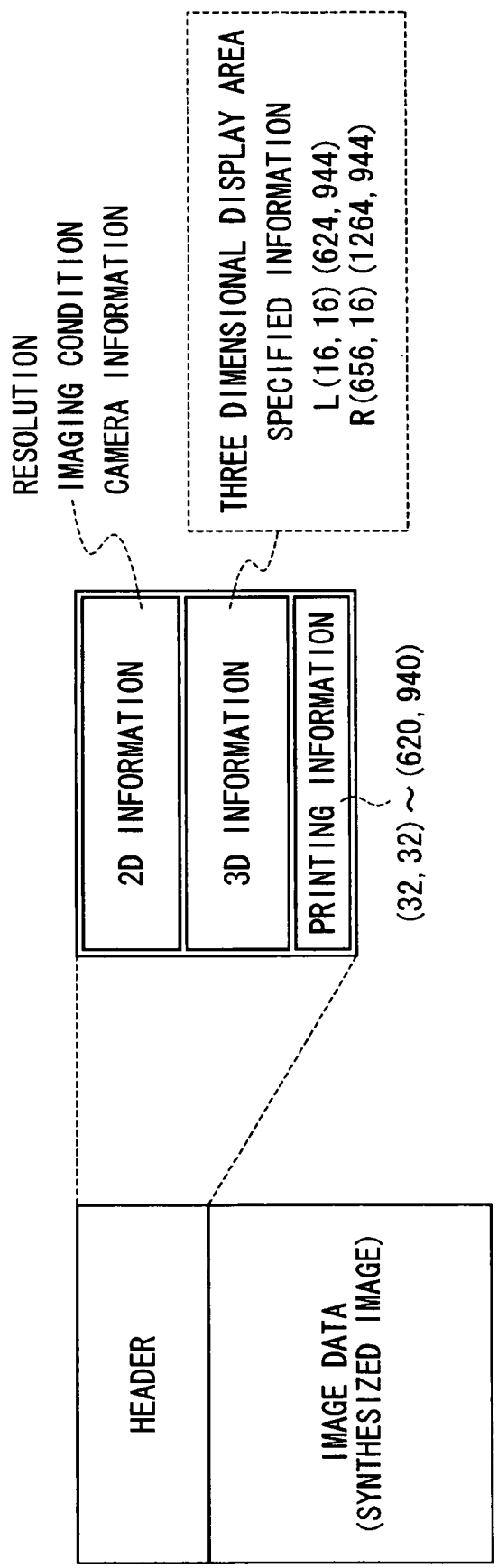
FIG. 5 is a schematic diagram illustrating the structure of an image file in which 2D and 3D information and multi-viewpoint images are stored.

At a step S3, a display area is specified in a multi-viewpoint image in one image. For example, as illustrated in FIG. 4, a rectangular area as a left three dimensional display area with (16, 16) to (624, 944) as diagonal points and a rectangular area as a right three dimensional display area with (656, 16) to (1264, 944) as diagonal points are specified out of a total image area of 1280×960. Any three dimensional display area may be specified through manual inputs such as through a cross button or an OK key (not shown).

At a step S4, a printing area conforming to an aspect ratio of a desired size of printing paper is specified in the left or the right three dimensional display area forming a multi-viewpoint image. For example, as illustrated in FIG. 4, out of the left three dimensional display area, a rectangular area with (32, 32) to (620, 940) as diagonal points is specified as a printing area. Paper size such as "post card," "B6 (B-series is a series of paper size commonly used in Japan)" and "A4" is specified through manual inputs such as through the cross button or the OK key (not shown) and an inscribed rectangular area in which an aspect ratio of a specified paper size is secured at the maximum in the left or the right three dimensional display area may be automatically taken as a printing area.

In addition, the automatically determined printing area can be fine-tuned through manual inputs such as through the cross button or the OK key (not shown). This is because a left and a right viewpoint image are included in a single synthesized image and a boundary between viewpoint images is unclear so that merely automatically specifying a printing area may include unclear boundary portion in the printing area. The manual operations prevent this problem.

At a step S5, a determination is made as to whether the release switch 114 is completely depressed. If the release switch 114 is completely depressed, the process proceeds to a step S6.

At a step S6, an imaging process is performed to acquire still image data in response to the complete depression of the release switch 114.

At a step S7, the acquired still image data is subjected to a predetermined compression process to form a single compressed image data (synthesized image) including each viewpoint image. The synthesized image can be formed in such a manner that described in Japanese Patent Application Laid-Open No. 2002-77942 for example.

At a step S8, information as to resolution of image, imaging conditions, and the camera is stored in a storing area of planer image information (2D information) provided at the header portion of an image file.

At a step S9, a three-dimensional display area specifying information including the coordinates of the left and the right three dimensional display area is stored in the storing area of three dimensional image information (3D information) provided at the header portion of the image file.

At a step S10, printing information including coordinates of the printing area is stored in the storing area of printing information provided at the header portion of the image file. Printing information recorded in the header portion is preferably written in a general-purpose format such as XHTML-Print format (structured tag language) and DPOF (Digital Print Order Format) to enable the printing information to be used by any output appliance.

At a step S11, the synthesized image is stored in a portion where the image main body is stored in the image file. An image file in which 2D information, 3D information and printing information are stored in the header portion and a compressed image data is stored in the portion where the image main body is stored in the image file is recorded in recording media 76.

At a step S12, a normal planar (two dimension) image is captured and recorded in response to the complete depression of the release switch 114. A detailed operation is the same as the conventional manner, so that description thereof is omitted.

Figure 6:
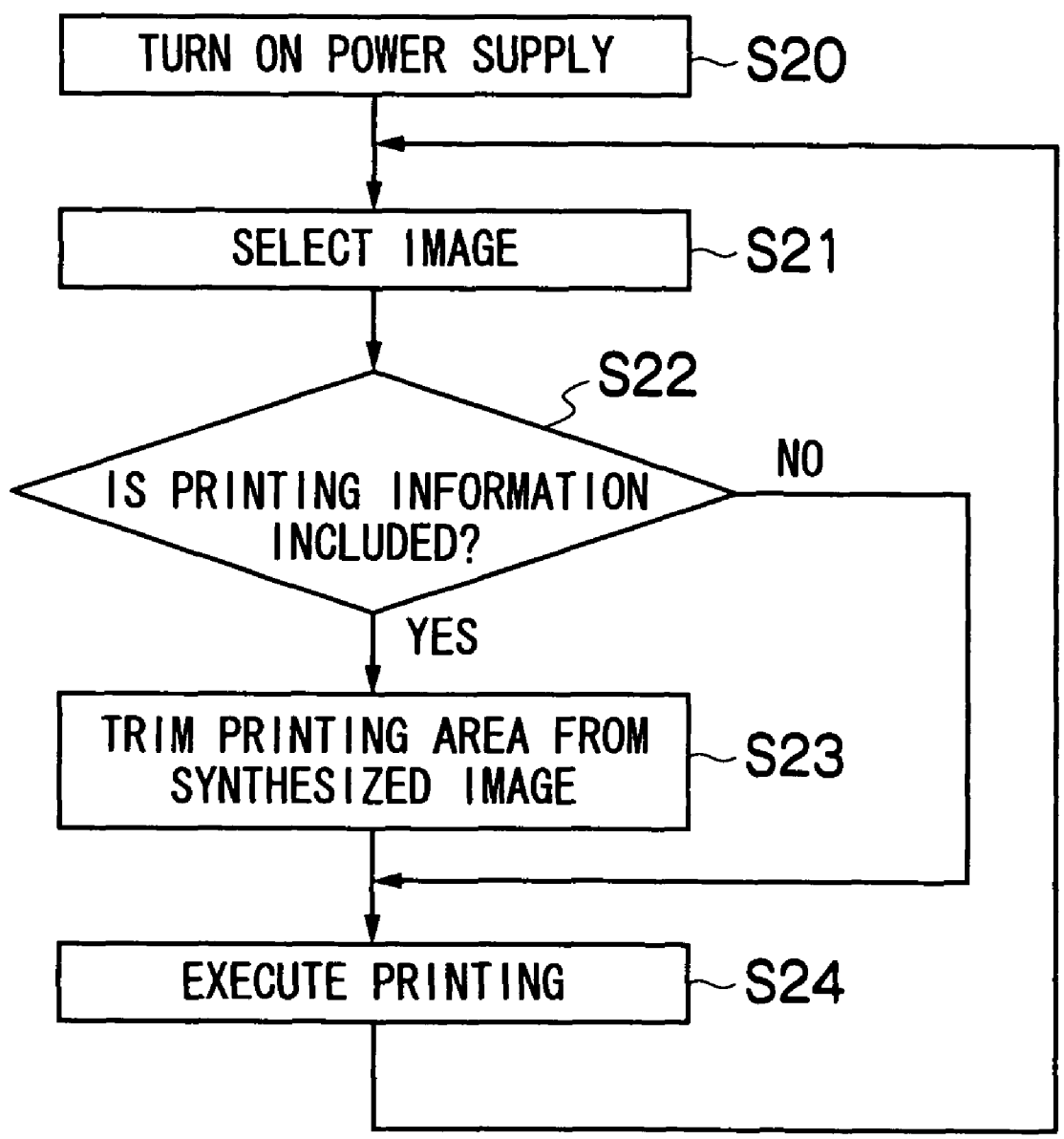
FIG. 6 is a flow chart illustrating the flow of a printing operation.

FIG. 6 is a flow chart illustrating the flow of printing operation of the printer 300. The system control unit 75 controls the execution of the process.

At a step S20, depressing the power supply switch starts supplying power to each block of the printer 300.

At a step S21, an image file is read from the recording medium 76 to display a file name or a thumbnail image on the display unit 93. Any image file corresponding to the displayed file or thumbnail is selected by a manual inputting device such as an operating button or a touch panel (not shown). If an image file is selected, the process proceeds to a step S22.

At a step S22, a determination is made as to whether printing information is included in the header portion of the selected image file. If the printing information is included, the process proceeds to a step S23. If not, the process proceeds to a step S24.

At a step S23, a printing area specified by printing information is trimmed from the image data stored in the portion where the image main body is stored in the image file.

At a step S24, the printing engine 91 converts the trimmed printing area into print data, and sends the data to the printing unit 90. The printing unit 90 prints the printing area conforming to the aspect ratio of the printing paper and ejects the printing paper.

The above process prints such that the printing area in the image data can conform to the aspect ratio of the printing paper, so that even if a printer does not correspond to the output of the multi-viewpoint image, an image worthy of appreciation can be printed.

"Printing information" does not always need to be used in a printer, but it can be used in a display device which does not correspond to the output of the multi-viewpoint image, therefore it should be practically referred to as "output information" in a broad sense.

That is to say, a printing area specified by printing information is trimmed from the image data stored in the portion where the image main body is stored in the image file, the trimmed printing area is converted into a video signal and the video signal can be output. In this case, even if a display device does not correspond to the output of the multi-viewpoint image, a two dimensional image can be viewed.

Figure 7:
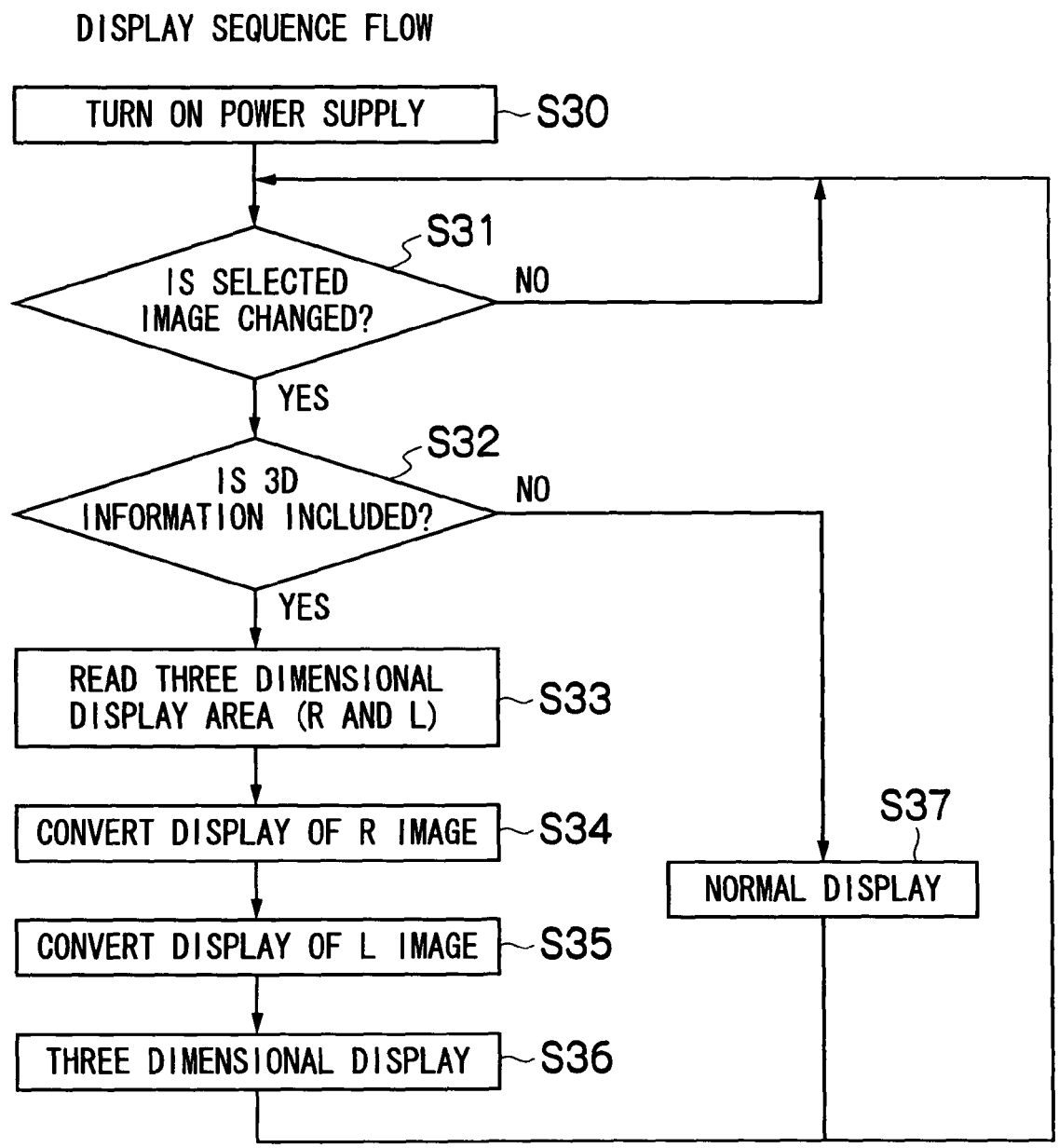
FIG. 7 is a flow chart illustrating the flow of a displaying operation.

FIG. 7 is a flow chart illustrating the flow of a displaying operation in the camera 10. The system control unit 62 controls the execution of the process. However, this process does not always need to be executed by the camera 10, but it is executed by an output device capable of reproducing and displaying the multi-viewpoint image such as a TV, a DVD player and a personal computer.

At a step S30, depressing the power supply switch starts supplying power to each block.

At a step S31, an image file is read from the recording medium 76 to display a file name or a thumbnail image on the display unit 100. Any image is selected by a manual inputting device such as an operating button or a touch panel (not shown). If an image is selected, the process proceeds to a step S32.

At a step S32, a determination is made as to whether 3D information is included in the header portion of the image file. If the 3D information is included, the process proceeds to a step S33. If not, the process proceeds to a step S37.

At a step S33, the 3D information is read out from the header portion of the image file.

At a step S34, a right three dimensional display area is extracted from the image data stored in the portion where the image main body is stored in the image file based on the read out 3D information.

At a step S35, a left three dimensional display area is extracted from the image data stored in the portion where the image main body is stored in the image file based on the read out 3D information.

At a step S36, a three dimensional image is reproduced by the display unit 100 based on the extracted left and right three dimensional display area. A system may be applied in which images in the left and the right three dimensional display area from the display unit 100 are separated respectively to cause the left and the right eye of a viewer to recognize the images using three dimensional glasses in order to provide the viewer with stereognostic sense by the display unit 100 (or, an output device capable of reproducing and displaying the multi-viewpoint image). Alternatively, the display unit 100, etc. may use a lenticular system using a lenticular lens sheet, a parallax system using slit array sheet, integral photography system using micro-lens array sheet and holography system using interference phenomenon.

At a step S37, the synthesized image is displayed on the display unit 100. The printing area is extracted from the image data stored in the portion where the image main body is stored in the image file based on the printing information to display the printing area on the display unit 100.

Second Embodiment

Printing information does not necessarily need to be stored in the header portion of the image file in which the synthesized image is stored, but it may be stored in another file if the printing area is associated with the image data to be extracted.

Figure 8:
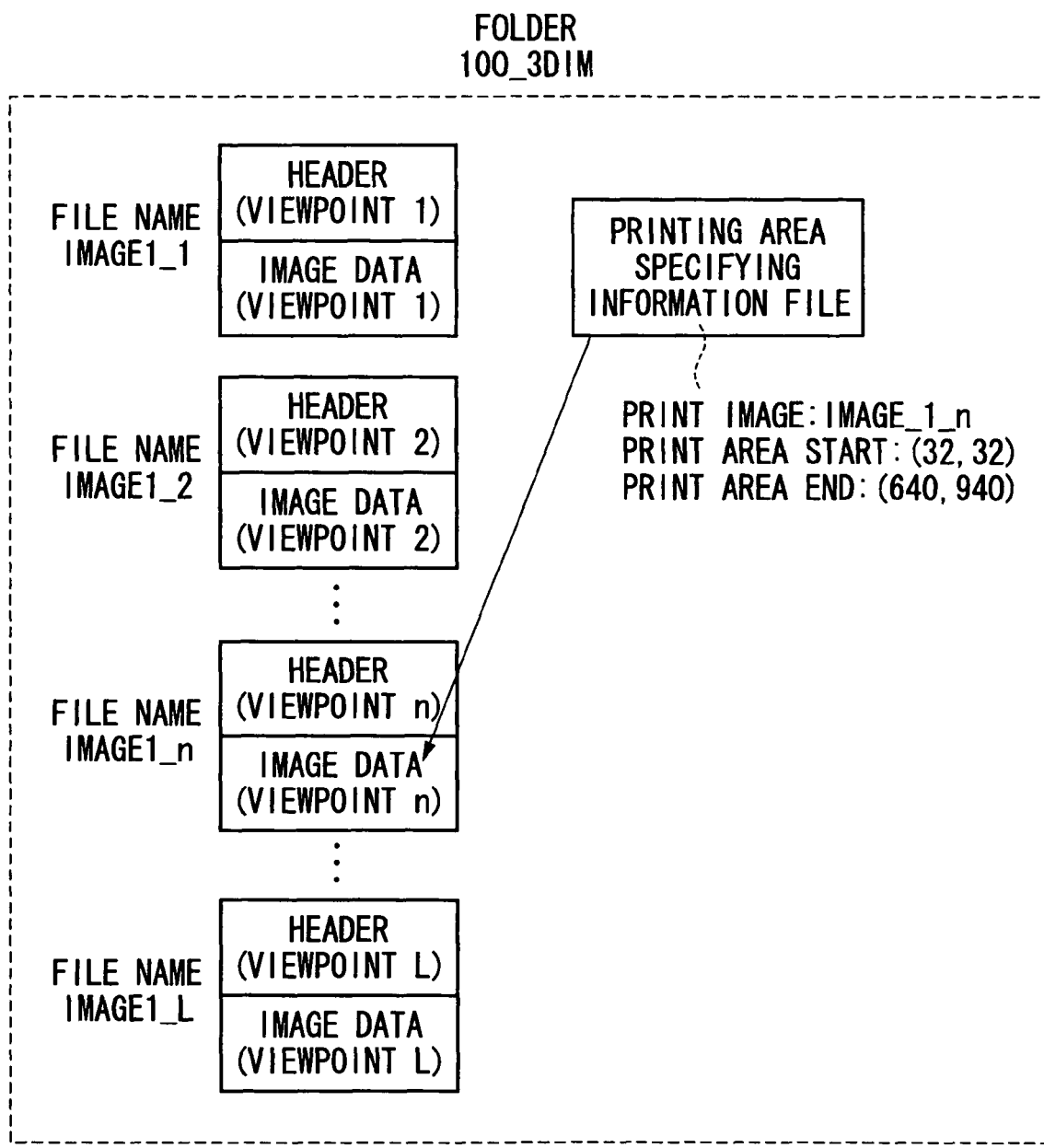
FIG. 8 is a schematic diagram illustrating the association of an image file in which a specific viewpoint image is recorded with a file in which printing area information is recorded.

That is to say, as illustrated in FIG. 8, out of the multi-viewpoint images composed of a plurality of viewpoint images (L pieces of images) "Image1_1" to "Image1_L," a specific viewpoint image "Image1_n" obtained at a viewpoint (a viewpoint where an image is less distorted) suited for printing is associated with a printing-area specifying information file which stores printing information. Specifically, the association of the specific viewpoint image "Image1_n" with the printing-area specifying information file is performed by storing the file name of the specific viewpoint image "Image1_n" in the header of the printing-area specifying information file. Alternatively, it may be performed by storing the file name of the printing-area specifying information file in the header of the specific viewpoint image "Image1_n" or by recording a table which associates the identification information of the specific viewpoint image "Image1_n" with the identification information of the printing-area specifying information file.

Since each viewpoint image is stored in a separate file, the boundary between the viewpoint images in the synthesized image does not become unclear as is not the case with the first embodiment. In addition, there is no need to record information showing that which area in the synthesized image corresponds to the viewpoint image, as is not the case with the first embodiment.

At the step S22 in the flow of a printing operation described above, a determination is made as to whether the printing information can be read out from the printing-area specifying information file associated with the viewpoint image "Image1_n" instead of reading out the printing information from the header of the viewpoint image "Image1_n." If the printing information can be read out, the process proceeds to the step S23.

At the step S23, the printing area is extracted from the viewpoint image "Image1_n" related to the read out printing information. Then, the extracted printing area is formed into print data and the data is printed by the printing unit 90. As described above, the extracted printing area may be formed into a video signal to be output to a video reproducing appliance.

Thus, even if a plurality of multi-viewpoint images is stored without synthesized into a single image file, it is enabled to execute an output operation such as printing a single viewpoint image based on a specific viewpoint image, and so on.

Third Embodiment

As described in the second embodiment, each viewpoint image may be stored in a separate file, however, when files of each viewpoint image are scattered and lost due to user's error, it is inconvenient to handle multi-viewpoint images at the time of reproduction.

Figure 9:
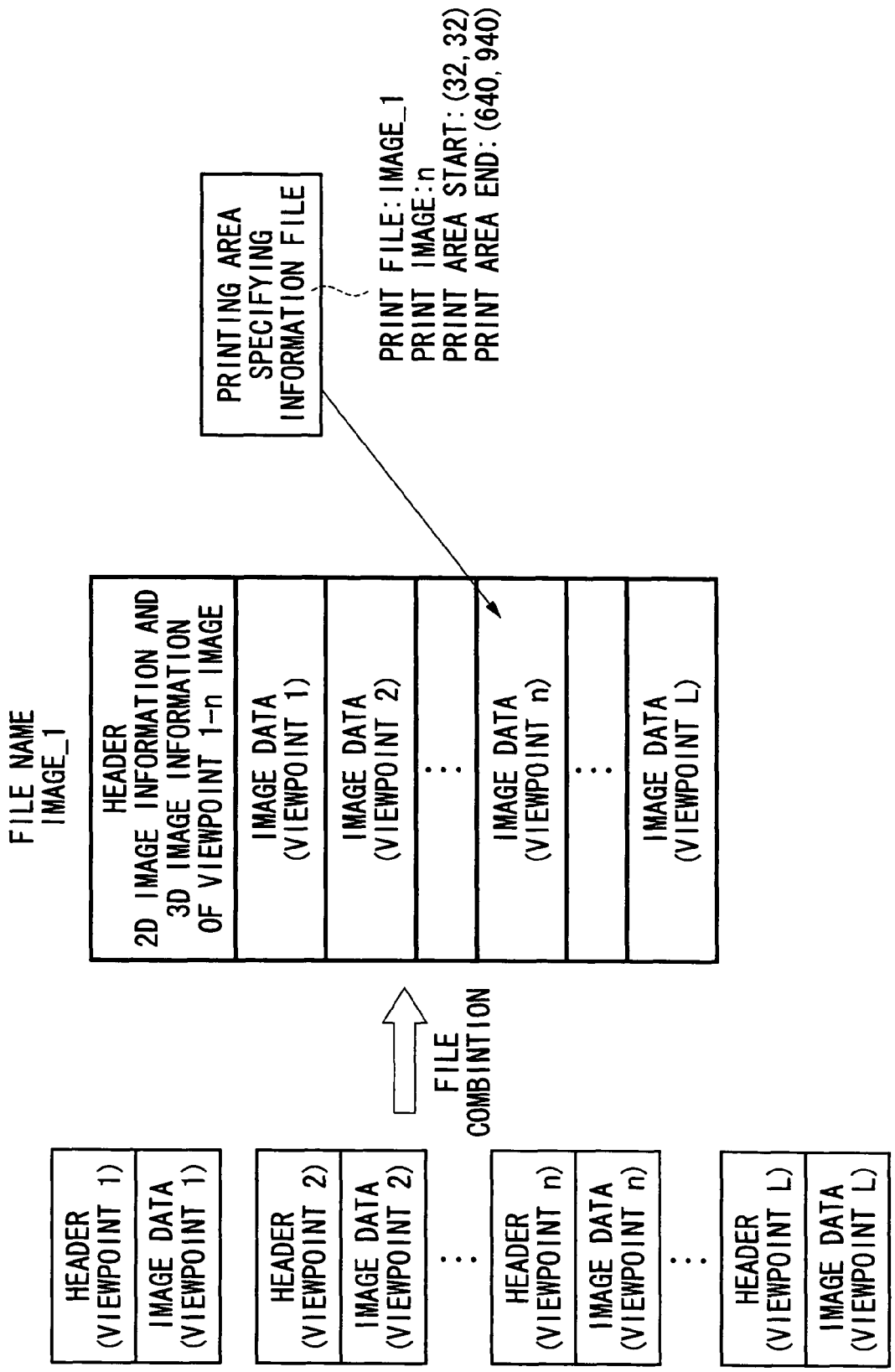
FIG. 9 is a schematic diagram illustrating the association of an image file obtained by combining each viewpoint images with a file in which printing area information is recorded.

Then, as illustrated in FIG. 9, each viewpoint image stored in each file may be sequentially stored in a single image file to couple each viewpoint file to one image file.

The image file illustrated in FIG. 9 is divided into a header portion and a data main body portion. The planar image information of each viewpoint image (2D information) and three dimensional image information (3D information) are stored in the header portion. The viewpoint image data corresponding to the image data stored in each file in the second embodiment is coupled to each other on a frame basis and recorded in the data main body portion. In addition, a position where the viewpoint image of each frame is stored is stored in the header portion to identify each frame coupled at the data main body portion.

Specifically, the association of the printing-area specifying information file with the specific viewpoint image is performed by storing the image file name (where, "Image1_") coupled to each viewpoint image and the frame number (where, n) of the specific viewpoint image "Image1_n" in the header of the printing-area specifying information file. The frame number may be common to the identification number of the viewpoint.

The files may be coupled after an individual viewpoint image file has been formed as described in the second embodiment or coupled at the time of imaging or after the completion of imaging. Alternatively, the files may be coupled according to a prescribed operation of an imaging device or a personal computer.

In either case, as described above, each viewpoint image file is coupled to a single image file to prevent the viewpoint image from being scattered and lost, simplifying handling the multi-viewpoint image.

What is claimed is:

1. An image output system comprising:
   an image generating unit which generates a multi-viewpoint image being an image from plural different viewpoints;
   a first specifying unit which specifies a first output information showing at least the plural different viewpoints of the multi-viewpoint image generated by the image generating unit;
   a second specifying unit which specifies a second output information showing an image area to be output as a single viewpoint image from among the plural different viewpoints of the multi-viewpoint image;
   a recording unit which associates the second output information specified by the second specifying unit with the multi-viewpoint image and the first output information specified by the first specifying unit and records the second output information in a predetermined recording medium in a general-purpose format;
   a first output unit which outputs the multi-viewpoint image based on the first output information recorded in the predetermined recording medium; and
   a second output unit which outputs the single viewpoint image based on the second output information recorded in the predetermined recording medium,
   wherein the recording unit combines the files of separate viewpoint images in which images from plural different viewpoints are stored to a single image file and records the files, records the second output information in a separate file in the general-purpose format and records information which associates the file of the second output information with the single image file including an area shown by the second output information.

2. The image output system according to claim 1, wherein the image generating unit generates a single synthesized image from the multi-viewpoint image,
   the first specifying unit specifies the first output information showing an area to be output as each viewpoint image out of the single synthesized images, and the recording unit records the first and the second output information and the synthesized image in a single file.

3. The image output system according to claim 1, wherein the recording unit records images from plural different viewpoints as a separate viewpoint image in separate image files respectively, records the second output information in a separate file in the general-purpose format and records information which associates the file of the second output information with the image file including an area shown by the second output information.

4. The image output system according to claim 1, wherein the second output device includes a printer, and the area shown by the second output information is specified to conform to the aspect ratio of printing paper of the printer.

5. The image output system according to claim 2, wherein the second output device includes a printer, and the area shown by the second output information is specified to conform to the aspect ratio of printing paper of the printer.

6. The image output system according to claim 3, wherein the second output device includes a printer, and the area shown by the second output information is specified to conform to the aspect ratio of printing paper of the printer.

7. An image generating device comprising:

an image generating unit which generates a multi-viewpoint image being an image from plural different viewpoints;

a first specifying unit which specifies a first output information showing at least the plural different viewpoints of the multi-viewpoint image generated by the image generating unit;

a second specifying unit which specifies a second output information showing an image area to be output as a single viewpoint image from among the plural different viewpoints of the multi-viewpoint image; and a recording unit which associates the second output information specified by the second specifying unit with the multi-viewpoint image and the first output information specified by the first specifying unit and records the second output information in a predetermined recording medium in a general-purpose format, wherein the recording unit combines the files of separate viewpoint images in which images from plural different viewpoints are stored to a single image file and records the files, records the second output information in a separate file in the general-purpose format and records information which associates the file of the second output information with the single image file including an area shown by the second output information.

8. A method of generating an image comprising the steps of:

generating a multi-viewpoint image being an image from plural different viewpoints;

specifying a first output information showing at least the plural different viewpoints of the generated multi-viewpoint image; and specifying a second output information showing an image area to be output as a single viewpoint image from among the plural different viewpoints of the multi-viewpoint image; and associating the second output information with the multi-viewpoint image and the first output information and recording the second output information in a predetermined recording medium in a general-purpose format, wherein the recording unit combines the files of separate viewpoint images in which images from plural different viewpoints are stored to a single image file and records the files, records the second output information in a separate file in the general-purpose format and records information which associates the file of the second output information with the single image file including an area shown by the second output information.

* * * * *